(12) United States Patent
Volgin et al.

(10) Patent No.: US 9,328,654 B2
(45) Date of Patent: May 3, 2016

(54) INTERNAL COMBUSTION ENGINE

(76) Inventors: Aleksandr Nikolaevich Volgin, Moscow (RU); Nikolai Aleksandrovich Volgin, Moscow (RU)

(*) Notice: Subject to any disclaimer, the term of this patent is extended or adjusted under 35 U.S.C. 154(b) by 199 days.

(21) Appl. No.: 13/983,815

(22) PCT Filed: Feb. 8, 2012

(86) PCT No.: PCT/RU2012/000079
§ 371 (c)(1),
(2), (4) Date: Aug. 6, 2013

(87) PCT Pub. No.: WO2012/108792
PCT Pub. Date: Aug. 16, 2012

(65) Prior Publication Data
US 2013/0312396 A1    Nov. 28, 2013

(30) Foreign Application Priority Data
Feb. 9, 2011    (RU) ................................ 2011104434

(51) Int. Cl.
*F02B 35/00*    (2006.01)
*F02B 35/02*    (2006.01)
(Continued)

(52) U.S. Cl.
CPC ................. *F02B 35/02* (2013.01); *F01L 1/024* (2013.01); *F01L 1/053* (2013.01); *F01L 1/46* (2013.01); *F01L 1/0532* (2013.01);
(Continued)

(58) Field of Classification Search
CPC . F01N 13/107; F01N 2290/06; Y02T 10/146; F02B 39/04; F01L 1/0532; F01L 1/46

USPC ........................................................... 60/315
See application file for complete search history.

(56) References Cited

U.S. PATENT DOCUMENTS 5,867,984 A    2/1999  Zedan
2004/0097047 A1*    5/2004  Natzle et al. .................. 438/300
(Continued)

FOREIGN PATENT DOCUMENTS

SU    889878    12/1981
SU    1719679    3/1992

OTHER PUBLICATIONS

English Abstract of SU 1719679.
(Continued)

*Primary Examiner* — Jesse Bogue
*Assistant Examiner* — Diem Tran
(74) *Attorney, Agent, or Firm* — Preston Smirman; Smirman IP Law, PLLC

(57) ABSTRACT

The invention relates to engine construction, in particular to systems for regulating internal combustion engines. The invention makes it possible to reduce the toxicity of exhaust gases. A four-stroke reciprocating internal combustion engine is equipped with a vacuum valve. During the discharging of the exhaust gases, a vacuum pump pumps combustion products out of the cylinder via the vacuum valve. First of all, a discharge valve is opened, and the vacuum valve is opened later, after complete (or partial) closing of the discharge valve, and the vacuum valve is closed later on or at the same time as an inlet valve opens. The vacuum valve is situated in the exhaust pipe, and an additional shut-off valve is mounted downstream of said vacuum valve, along the path of the exhaust gases, the shut-off valve connecting the exhaust pipe to the exhaust manifold or disconnecting the exhaust pipe therefrom.

10 Claims, 4 Drawing Sheets

(51) Int. Cl.
*F01L 1/02* (2006.01)
*F01L 1/053* (2006.01)
*F01L 1/46* (2006.01)
*F01N 13/10* (2010.01)
*F02B 39/04* (2006.01)

(52) U.S. Cl.
CPC .......... *F01L 2820/01* (2013.01); *F01N 13/107* (2013.01); *F01N 2290/06* (2013.01); *F02B 39/04* (2013.01); *Y02T 10/146* (2013.01)

(56) References Cited

U.S. PATENT DOCUMENTS

2004/0175906 A1* 9/2004 Edo ............................... 438/584
2011/0021033 A1* 1/2011 Ikeuchi et al. ................ 438/758

OTHER PUBLICATIONS

English Abstract of SU 889878.

* cited by examiner

Along A

INTERNAL COMBUSTION ENGINE

CROSS-REFERENCE TO RELATED APPLICATION

The instant application is a national phase of, and claims priority to, PCT International Application No. PCT/RU2012/000079, filed on Feb. 8, 2012, pending, and Russian Patent Application Serial No. 2011104434, filed Feb. 9, 2011, pending, the entire specifications of both of which are expressly incorporated herein by reference.

This invention relates to four-piston internal combustion engines.

Figure 1:
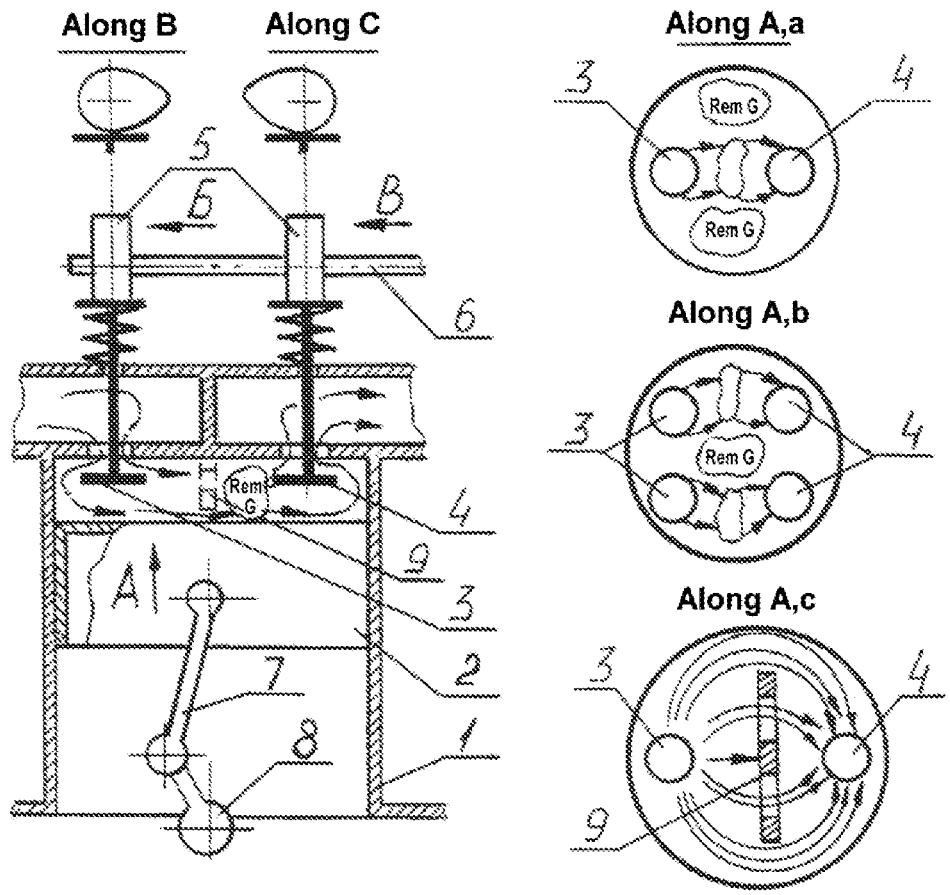

The list of abbreviations used in the text and on the drawings follows.
- ICE internal combustion engine
- UDP upper dead point of the piston
- LDP lower dead point of the piston
- CC combustion chamber
- RemG remnant gases
- ExG exhaust gases
- Inv inlet valve
- ExV exhaust valve
- VacV vacuum valve
- StV stop valve
- CB cylinder block
- CBH head of cylinder block
- EC efficiency coefficient
- $P_{max}$ ICE maximum power, h.-p.
- $P_{exp}$ pressure inside the exhaust pipe
- $P_C$ Pressure inside a cylinder, atm
- $V_C$ Cylinder volume
- $V_{CC}$ CC volume
- $V_{exp}$ exhaust pipe volume
- GT gas turbine
- VTP vacuum turbo pump
- GTVP gas turbine vacuum pump
- Abbreviations on the gas distribution circle diagrams The opening or closing angle of the valves is measured in the clockwise direction, starting at the UDP of the intake stroke; measured in degrees of rotation of the crankshaft.
- 0° the reference point—UDP of the start of the inlet stroke
- 180° LMP of the inlet stroke
- 360° UDP of the compression stroke
- 540° LDP of the working stroke
- 720° UDP of the exhaust stroke
- $\phi$ angles between the opening and shutting momenta of the valves
- $\alpha$ the angle between UDP or LDP and the vales opening momenta of the valves
- $\beta$ angles between UDP or LDP and the shutting momenta of the valves
- thick lines correspond to the valves shut position
- fine lines, to the valves open situation The illustrations include:

FIG. 1: a classic piston four-stroke ICE

Figure 2:
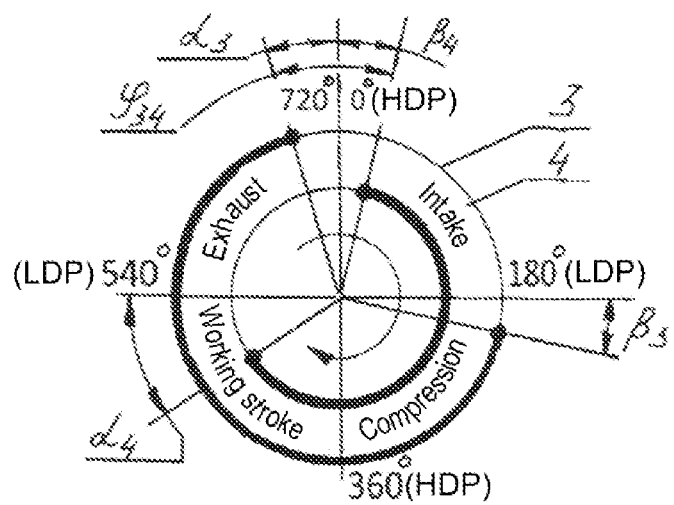

FIG. 2: a classic circle gas-distribution diagram of the internal combustion engine shown in FIG. 1

Figure 3:
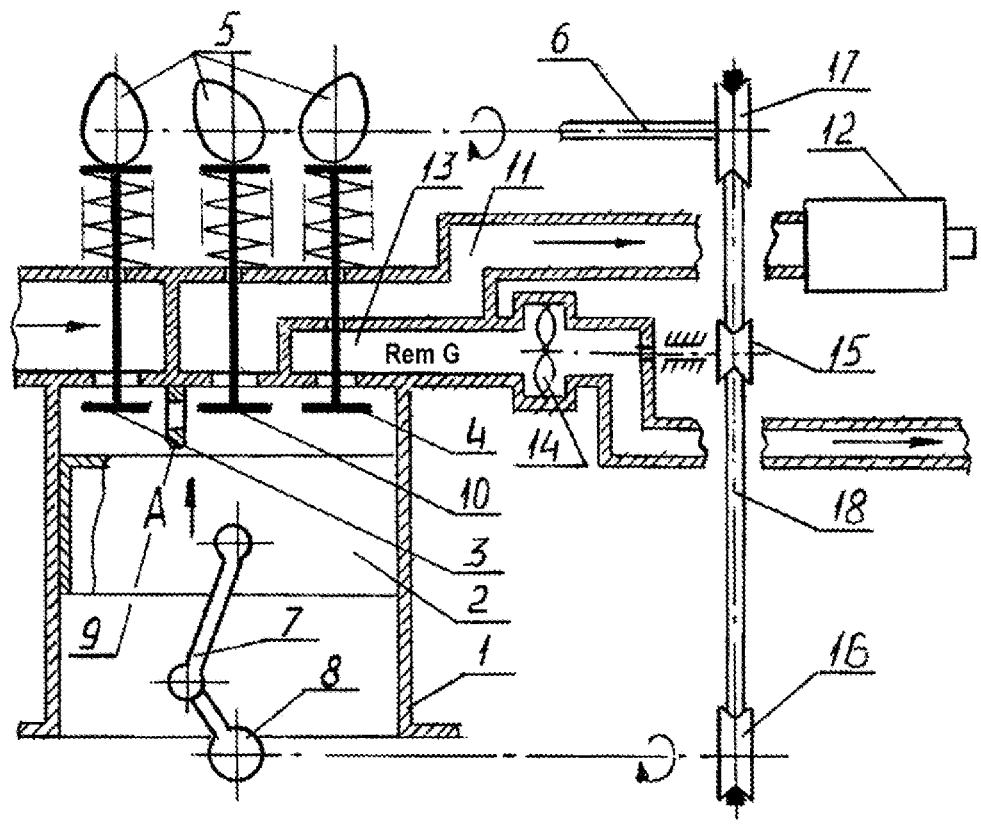
Figure 3:
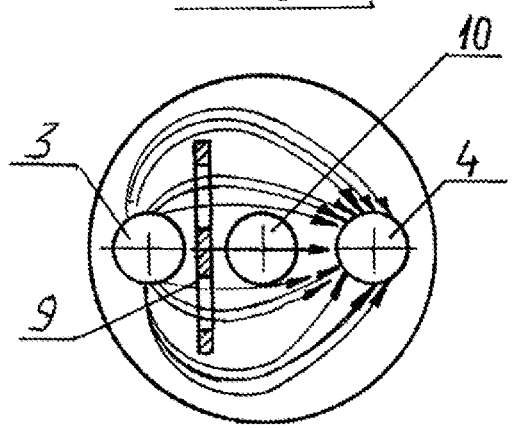
Figure 4:
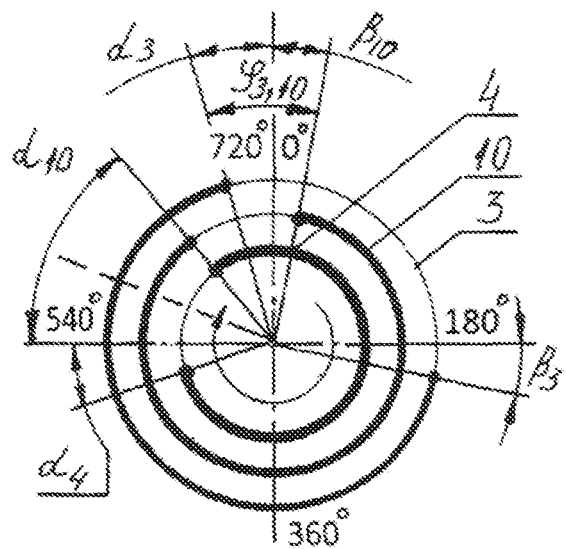

FIG. 3 a three-valve ICE with separate exhaust collectors and a partition wall in the combustion chamber FIG. 4 a gas-distribution circle diagram for the internal combustion engine shown in FIG. 3

Figure 5:
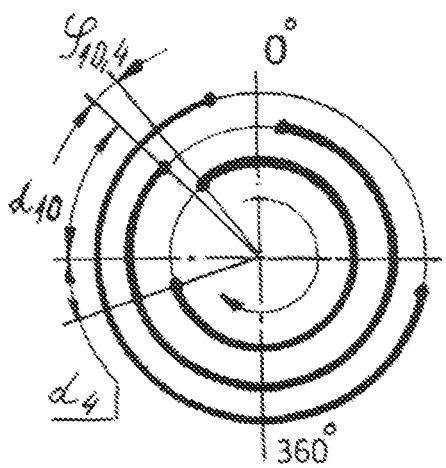
Figure 6:
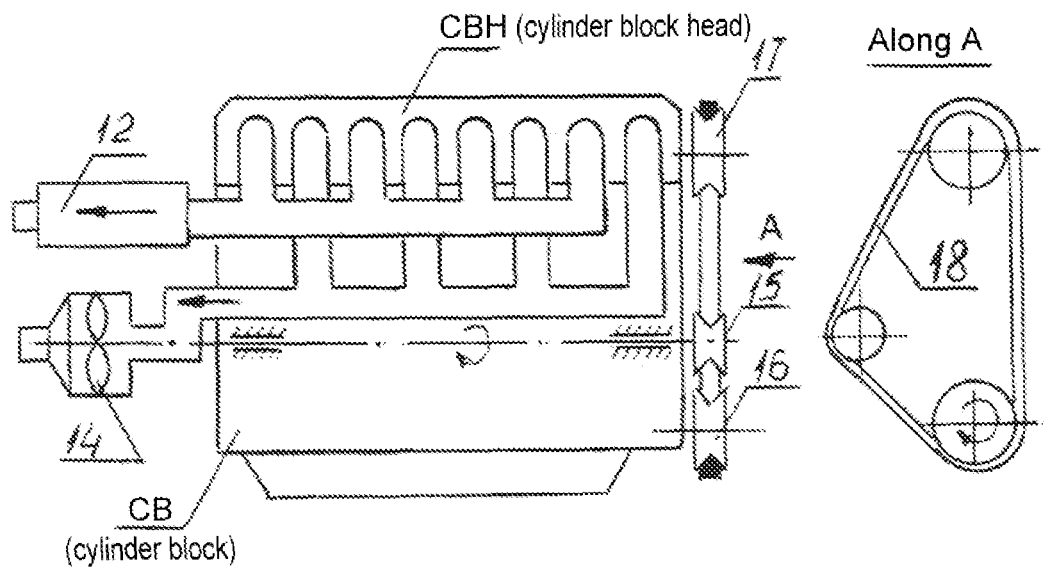

FIG. 5 a gas-distribution circle diagram for the internal combustion engine shown in FIG. 3 with overlapped exhaust valves FIG. 6. A diagram of a four-cylinder internal combustion engine with a vacuum turbo pump FIG. 7. A four-cylinder ICE with a gas-turbine drive of the vacuum pump.

Figure 7:
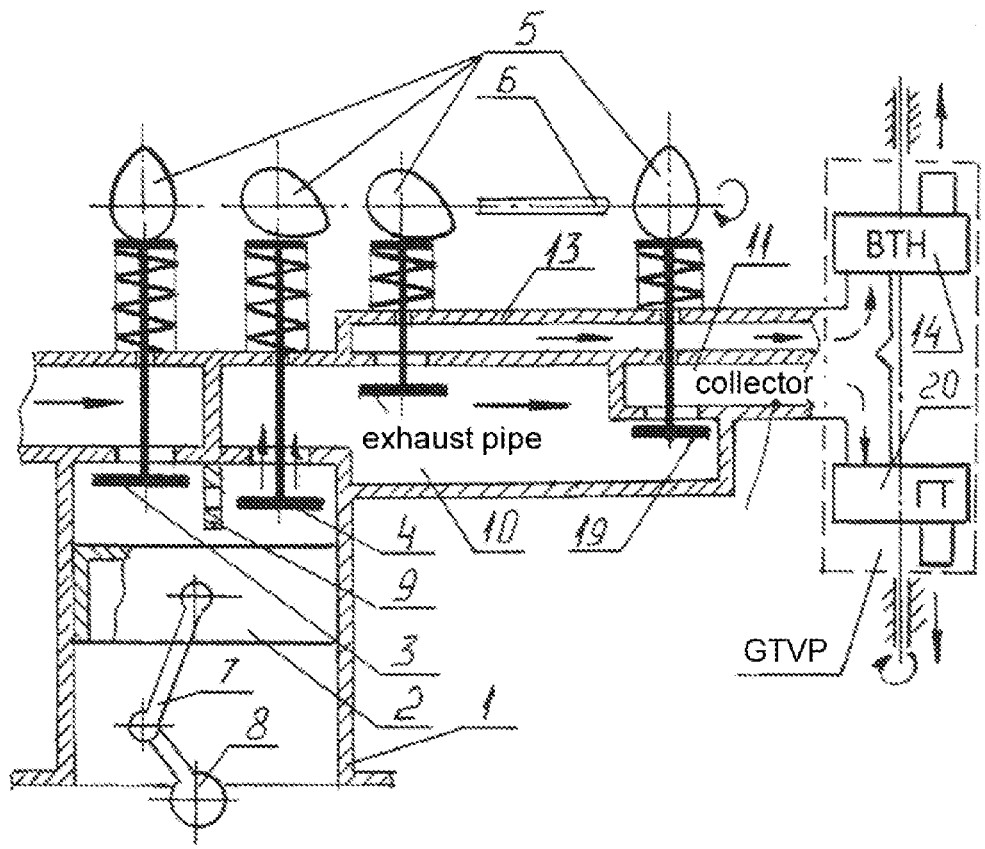
Figure 8:
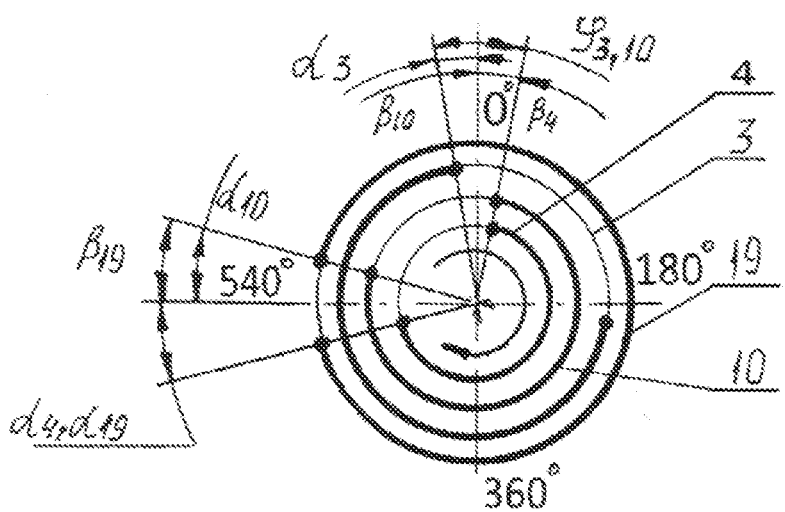

FIG. 8. A gas distribution circle diagram of the inner combustion engine shown in FIG. 7.

Operation of different internal combustion engines is discussed, using a single cylinder benzene ICE as an example. Supply and ignition systems are not indicated on the diagrams.

In general, a classic ICE (FIG. 1) includes a cylinder 1 with a piston 2, an inlet valve 3 and an exhaust valve 4. The valves are engaged via lobes 5 of camshaft 6. Piston 2 rotates crankshaft 8 via connecting rod 7.

The Internal combustion engine is depicted at the end of its outlet stroke, when the piston does not quite reach the 720° point. A classic ICE with two valves per cylinder has a high CO and CH contents on low speeds, while lacking power on high speeds. This is so because the air from the inlet collector is not capable of cleaning (blasting out) the combustion chamber (CC) from remnant gases (RemG) at the end of the inlet stroke/the start of the exhaust stroke (the 720° point). Air-blasting takes place when the valves are overlapped (angle $\phi_{34}$). At that time (see FIG. 1, A, a), a jet of air is weak and, usually, travels the shortest distance from InV 3 to ExV 4. Remnant gases are not moving around the circumference of the CC, so that even raising air pressure at the exhaust end, using a turbo pump or a separate compressor (/1/, /2/) does not have much positive effect on the blasting. Velocity of the air blast along the shortest route from InV 3 to ExV 4 or from a high pressure source to ExV 4 increases, yet some RemG still remain in the outer regions of the combustion chamber.

Doubling the number of inlet or exhaust valves decreases the quantity of RemG in the combustion chamber in the vicinity of 720° (see FIG. 1, A, b). The CO and CH levels during the idle revolutions decrease a little, while $P_{max}$ increases (by 10-15%).

Transverse partition wall 9 in the combustion chamber (FIG. 1, A, c), (FIG. 1, the dotted line) can improve to blast out RemG from the hard-to-reach areas. That partition wall carries non-uniform perforation, and it generally weakens the jet of the blasting air on the shortest route from InV 3 to ExV 4, forcing the air to travel along the circumference of the chamber and blast RemG out of the sluggish areas.

Usually, the exhaust of all the cylinders of a multi-cylinder ICE from all the exhaust valves goes into a common collector, then into the system of neutralisation and damping. Due to the considerable hydraulic resistance, generated, mainly, by the damper, pressure in the exhaust collector is higher than the atmospheric pressure virtually during the entire exhaust stroke. This limits the extent to which the cylinder can be filled with a fresh charge and decreases the momentum of the engine. It is a known fact that $P_{max}$ of an internal combustion engine with a damper is 10% lower, on the average, than of such an engine without a damper.

In the vicinity of 720°, when one cylinder is being blasted out (FIG. 2, angles $\alpha_3$, $\beta_4$, $\phi_{34}$), exhaust valve 4 opens in some other cylinder (angle $\alpha_4$), pressure in the common exhaust collector jumps up for a short time. This interferes with the blasting, and pushes $P_{max}$ down. Due to interaction between the cylinders, a multi-piston internal combustion engine has one or more narrow areas within its speed range, in which it does not intake well.

An internal combustion engine, in which ExG together with RemG is force-pumped out with an auxiliary cylinder /3/. Efficiency of this method is low because to form a considerable vacuum (0.5 atm for instance), the auxiliary cylinder has to have a 3-5 times greater volume than the main cylinder.

Another known internal combustion engine /4/ (accepted as the protagonist of this invention, in which at the start of the exhaust stroke (past the upper dead point) 0°, vacuum forms inside the cylinder through a separate valve. That vacuum is low. It is produced by ejection when the exhaust valve opens in another cylinder. However, this vacuum affords some reduction of the amount of RemG and some increase of the charge volume.

A positive effect takes place within a narrow speed range. In different operating conditions of an internal combustion engine, the effect might become negative, which is always observed when there is a gas connection between the cylinders.

We offer two engines based on the same principle to redeem these drawbacks: the ICE shown in FIG. 3 and the ICE shown in FIG. 7.

The ICE in FIG. 3 includes cylinder 1 with piston 2, InV 3 and ExV 4. The valves are engaged by lobes 5 of cam shank 6. Pistol 2 turns the crankshaft 8 via connection rod 7. The combustion chamber (CC) is equipped with transverse partition wall 9. The engine also includes vacuum valve 10 (VacV 10), which is engaged by its own lobe from the common camshaft. ExV 4 lets out remnant gases through the exhaust pipe and exhaust collector 11(of high pressure) and damper 12. The VacV 10 operates via a vacuum pipeline into collector 13 (of low pressure).

Vacuum in the pipeline and collector is produced by vacuum turbo pump 14. It is activated via pulley 15 from crankshaft 16 via pulley 17 and common belt 18, with reduction of the increase.

The internal combustion engine operates in the following fashion (FIGS. 3, 4, 5).

The cylinder picks up its charge during its exhaust stroke, compressing it during the following stroke, then the charge is ignited, then follows the working body expansion stroke (the working stroke). At the end of the working stroke, ExV 4 opens at angle $\alpha_4$ with LDP 540°. It lets out the main body of the exhaust gases (ExG) into collector 11 and damper 12. The duration of this is from $\alpha_4$ to $\alpha_m$. Then ExV 4 closes, while VacV 10 opens. While VacV 10 is open and InV 3 and ExV 4 are closed, RemG are pumped out from cylinder 1 by vacuum pump 14. The angle travelled during this time is $180°-\alpha_m-\alpha_3$. During this time, piston 2, due to the vacuum, is pulled inside cylinder 1, carrying out its useful work.

When InV 3 opens and during the overlapping $\phi_{3,10}$ of the valves, the combustion chamber (CC) is being blasted out by air from the inlet pipe. The RemG leave the chamber and enter collector 13 due to the vacuum produced by turbo pump 14.

When the 720° point has been reached, and a small angle $\beta_{10}$ (approximately) 8° has been travelled, VacV 10 shuts. While InV 3 is open, cylinder 1 picks up a new charge during the down travel of its piston 2.

Generally speaking, VacV 10 can be closed even before the 720° point is reached.

When the vacuum in the low pressure collector is high (P=0.1 for example), the quantity of RemG around the 720° point decreases tenfold in comparison with the classic ICE. When this is the case, no air blasting is required, and $\phi_{3,10}$ angle can be reduced even to zero. This decision depends on the gas distribution modification system.

The main part of the exhaust passes through ExV 4 and collector 11, which work under the most intensive heating conditions. VacV 10 opens later, when the temperature of the ExG in the cylinder is several times lower than at the start of the exhaust stroke, while the pressure slightly exceeds the atmospheric pressure. For this reason, pipeline 14 does not need to be designed to withstand high temperatures.

The most powerful acoustic front (explosion) occurs at the when ExV 4 opens. By the time VacV 10 opens, that noise will have already passed the damper. The flow of the ExG through collector 13 is not associated with much noise and, practically, requires no damper.

Having vacuum inside the cylinder during the exhaust stroke enables the designer to have considerably smaller $\alpha_4$, which has some important consequences:

1) Angle $\alpha_4$ can be decreased to 10-15° (against the usual 40-70°), working stroke angle $180°-\alpha_4$ can be increased, which improves the efficiency coefficient of the engine.

2) The temperature and pressure of the ExG at the start of the exhaust stroke decrease, which means that the diameters of the exhaust valves can be increased.

3) The pressure of the noise of the working ICE decreases. It is worth noting that the amount of energy used for producing a vacuum in collector 13 is not wasted: it pulls the piston into the cylinder when VacV 10 opens and ExV 4 closes. The diagram in FIG. 4 shows that it is practicable, from this point of view, to make $\alpha_{10}$ as small as possible so that to stretch out the time of the useful effect of the vacuum at the bottom of the piston. This angle can be decreased down to 20° (the dotted line in FIG. 4) and less.

ExV 4 and VacV 10 can have a $\phi_{10,4}$ overlap (see FIG. 5), and some of the ExG can be directed via VacV 10 before the RemG. It is obvious that $\phi_{10,4}$ must not be large, otherwise the discharge from collector 11 will be pumped intensively into collector 13. If there is no overlapping, then pressure of the ExG inside the cylinder cannot increase at the moment when the valves are switched over because in the LDP (lower dead point) vicinity, within the 0-20° range, the piston virtually does not travel upwards.

The ICE shown in FIG. 7 includes cylinder 1, piston 2 and the valves InV 3 and ExV 4. The valves are engaged by lobes 5 of cam shaft 6. Piston 2 turns crankshaft 8 via connection rod 7. The combustion chamber (CC) has transverse partition wall 9, which is perforated. VacV 10 is engaged by its own lobe of the common cam shaft. It is located in the outlet pipe, outside the cylinder. Lock valve 19 (StV 19) is located behind VacV 10 along the travel of the exhaust gases (ExG). The lock valve engages or disengages the exhaust pipe with high pressure collector 11. StV 19 has its own lobe on the common cam shaft. VacV 10 connects the exhaust pipe with low-pressure collector 13 via a vacuum pipeline. A vacuum in this collector is produced by vacuum turbo pump 14, which is activated by gas turbine 20, the inlet of which is connected with high-pressure collector 11, while its outlet is connected with the damper.

This ICE is depicted at the end of its outlet stroke; the piston is slightly below the upper dead point (UDP), 720°. See also FIG. 8.

This ICE works as follows.

Not reaching the 540° point by angle $\alpha_4$, ExV 4 opens, and StV 19 opens simultaneously. Exhaust gases leave cylinder 1 due to excess pressure and flow through the exhaust pipe into high pressure collector 11, then to gas turbine (GT) 20. The rotor of the turbine rotates the axis of the vacuum pump 14, so that a vacuum is formed in the vacuum pipeline and above VacV 10. When the $\alpha_{19}+\beta_{19}$ position is passed, StV 19 shuts, while VacV 10 opens (angle $\alpha_{10}$). Because of the vacuum produced, the exhaust gases (their main bulk has already left the cylinder by that point, so that the pressure inside the cylinder $P_C \approx 1.5$) flow into the low pressure collector 13. The pressure above the piston inside the cylinder is $P_C < 1$. The piston is pulled inside the cylinder, carrying out its useful work. This process continues up to the moment InV 3 opens (angle $\alpha_3$). Then, during the period when the valves 3 and 10 are overlapped ($\phi_{3,10}$ angle), the combustion chamber (CC) is blasted out. When this is completed, VacV 10 and ExV 4 become shut, and, while piston 2 travels downwards, cylinder 1 pick up a new charge via its InV 3. The compression and working strokes are identical with those in a classic ICE.

In this ICE model the outlet pipe (which serves as a receiver) cannot be of a great volume: otherwise too much energy would be required to produce a vacuum in it. On the average, $V_{ExP} \approx V_{CC}$.

This ICE keeps its working characteristics at $\alpha_4 < \alpha_{19}$ and at $\alpha_4 > \alpha_{19}$, tolerates small overlapping of StV 19 and VacV 10 ($\beta_{19} \neq \alpha_{10}$); when $\beta_{10} > \beta_4$, some vacuum will still remain in the exhaust pipe after the air blasting is over. This vacuum will help to remove ExG in the next stroke. The separate GT can generate a high vacuum (pressure at its entrance can measure $P_{TE} < 0.1$) even despite a small $\alpha_4$. This makes having partition wall 9 unnecessary, while the time required for air blasting is very short, and the angle is very small.

In this ICE model, the air for blasting flows through the open ExV 4, cooling it down to the atmospheric temperature (unlike in boost-using ICEs).

The vacuum as such reduces the temperature inside the cylinder, the vacuum at the start of the intake, accelerates the air in the inlet pipe and increases the charge without warming it up. This allows to use greater compression.

Using separate high and low pressure collectors helps avoiding interaction between the cylinders and, consequently, eliminate any failures of the momentum in the entire velocity range.

When the gas-distribution phase modification system is used, it can control InV 3 and ExV 4 as usually or, in a more sophisticated version, InV 3, ExV 4, and VacV 10, or in a simplified version, only VacV 10. Control over VacV 10 provides an opportunity to avoid excess blasting, maintain the vacuum and extract more useful work during the exhaust stroke in other cylinders.

On the whole, the ICE shown in FIG. 3 and the ICE shown in FIG. 7 are identical. However, the latter one has a slightly greater efficiency because of the use of a GTVP (gas turbine vacuum pump).

The invention claimed is:

1. A four-stroke piston internal combustion engine, with or without a gas distribution phase modification system (GDPMS), comprising:
    at least one cylinder, each cylinder containing an inlet valve, a vacuum valve, and an exhaust valve, which links a hollow portion of the cylinder with an exhaust pipe, in its turn, with an exhaust collector, containing a vacuum pump to remove any combustion products from the cylinder via an open vacuum valve;
    wherein the exhaust valve opens first during an exhaust gas removal stroke, while the vacuum valve opens later, after the exhaust valve has been fully or partly shut, while the vacuum valve closes either simultaneously with, or at a later time than, the inlet valve opens.

2. The internal combustion engine according to claim 1, further comprising:
    a combustion chamber;
    wherein the combustion chamber includes at least one transverse partition wall located between the inlet and exhaust valves, and running along a cylinder axis or at an angle to it and carrying an uneven perforation, so as to assure that a flow of blasting air from an inlet pipe is distributed across an entire volume of the combustion chamber in the direction from the inlet valve to the exhaust valve.

3. The internal combustion engine according to claim 1, wherein the gas distribution phase modification system, if used, controls a vacuum valve phase.

4. The internal combustion engine according to claim 1, further comprising a turbo pump operably associated with a belt of a cam shaft, or to a belt operably associated with a crankshaft, wherein an axis of the turbo pump runs parallel to an axis of the crankshaft.

5. The internal combustion engine according to claim 1, further comprising a turbo pump, wherein a rotor of the turbo pump is mounted on a shaft of an exhaust gas turbine, wherein an inlet of the shaft is connected to the exhaust collector.

6. A four-stroke piston internal combustion engine, with or without a gas distribution phase modification system (GDPMS), comprising:
    at least one cylinder, each cylinder containing an inlet valve, a vacuum valve, and an exhaust valve, that links a hollow portion of the cylinder with an exhaust pipe connected to an exhaust collector, a vacuum pump to remove any combustion products from the cylinder via the open vacuum valve;
    wherein a stop valve is located behind the vacuum valve along a travel route of any exhaust gases;
    wherein the stop valve connects or disconnects the exhaust pipe with the exhaust collector;
    wherein during the removal of the exhaust gases from the cylinder, the stop valve opens simultaneously with, or later than the exhaust valve;
    wherein the vacuum valve shuts simultaneously with, or later than the exhaust valve shuts, while the inlet valve is either open or shut.

7. The internal combustion engine according to claim 6, further comprising a combustion chamber;
    wherein the combustion chamber includes at least one transverse partition wall located between the inlet and exhaust valves, and running along a cylinder axis or at an angle to it and carrying an uneven perforation, so as to assure that a flow of blasting air from an inlet pipe is distributed across an entire volume of the combustion chamber in the direction from the inlet valve to the exhaust valve.

8. The internal combustion engine according to claim 6, wherein the gas distribution phase modification system, if used, controls a vacuum valve phase.

9. The internal combustion engine according to claim 6, further comprising a turbo pump operably associated with a belt of a cam shaft, or to a belt operably associated with a crankshaft, wherein an axis of the turbo pump runs parallel to an axis of the crankshaft.

10. The internal combustion engine according to claim 6, further comprising a turbo pump, wherein a rotor of the turbo pump is mounted on a shaft of an exhaust gas turbine, wherein an inlet of the shaft is connected to the exhaust collector.

* * * * *